United States Patent [19]
Phillips

[11] 4,032,118
[45] June 28, 1977

[54] SEALING MEANS FOR STIRRING APPARATUS

[76] Inventor: Edwin D. Phillips, 170 Albert St., N. Plainfield, N.J. 07060

[22] Filed: Oct. 21, 1975

[21] Appl. No.: 624,398

[52] U.S. Cl. .................... 259/122; 259/DIG. 16; 308/36.2
[51] Int. Cl.² ............... B01F 7/16; F16C 33/72
[58] Field of Search ... 259/121, 122, 125, DIG. 16; 308/36.1, 36.2

[56] References Cited

UNITED STATES PATENTS

| | | | |
|---|---|---|---|
| 1,290,733 | 1/1919 | Goecke | 259/125 |
| 2,622,943 | 12/1952 | Wankat et al. | 259/DIG. 16 |
| 2,829,931 | 4/1958 | De Pree et al. | 259/122 |
| 2,901,295 | 8/1959 | Becker | 308/36.1 |
| 2,973,997 | 3/1961 | Kirkland | 308/36.2 |
| 3,251,635 | 5/1966 | Phillips | 259/122 |

FOREIGN PATENTS OR APPLICATIONS

| | | | |
|---|---|---|---|
| 937,080 | 9/1963 | United Kingdom | 308/36.1 |

*Primary Examiner*—Richard E. Aegerter
*Assistant Examiner*—Richard R. Stearns
*Attorney, Agent, or Firm*—Shoemaker and Mattare, Ltd.

[57] ABSTRACT

A seal for stirring apparatus, wherein the stirring apparatus comprises an elongate glass rod having a stirrer blade at one end thereof for disposition inside a laboratory flask and the like to stir the contents thereof and motor means connected with the other end of the rod to rotate the rod, said seal including a glass stopper for fitting in the neck of a flask and the like, a synthetic plastic sleeve threadably engaged at one end thereof on the stopper and sealed relative thereto, synthetic plastic seal rings disposed in the sleeve for sealingly engaging a rotatable glass rod extended coaxially through the sleeve and stopper, and a synthetic plastic seal ring clamp threadably engaged with the other end of the sleeve and extended into clamping engagement with the seal rings to effect a secure and leak tight seal of the stirring apparatus relative to the flask and the like, and to enable adjustment of the seal as it becomes worn and the like.

10 Claims, 4 Drawing Figures

U.S. Patent     June 28, 1977     4,032,118
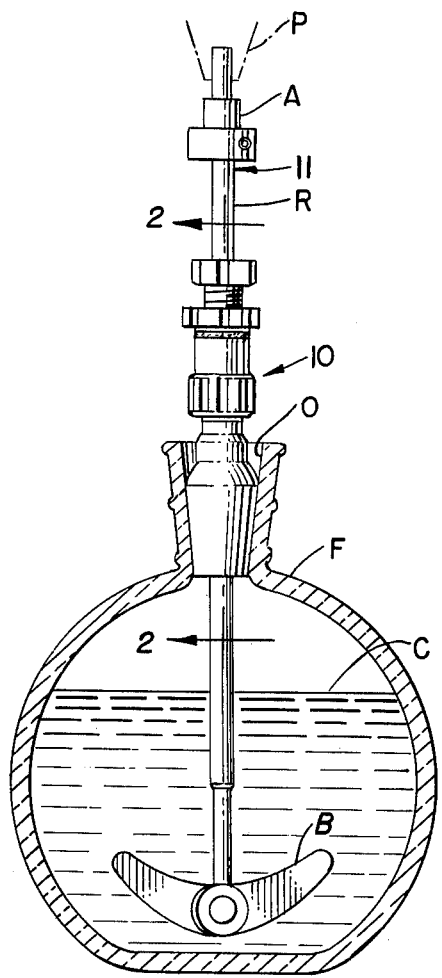
FIG.1.
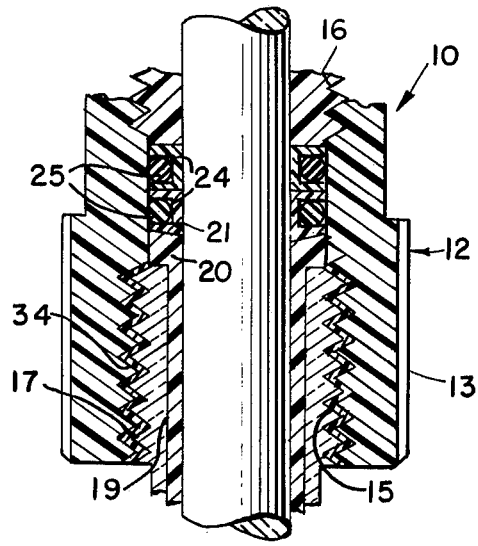
FIG.3.
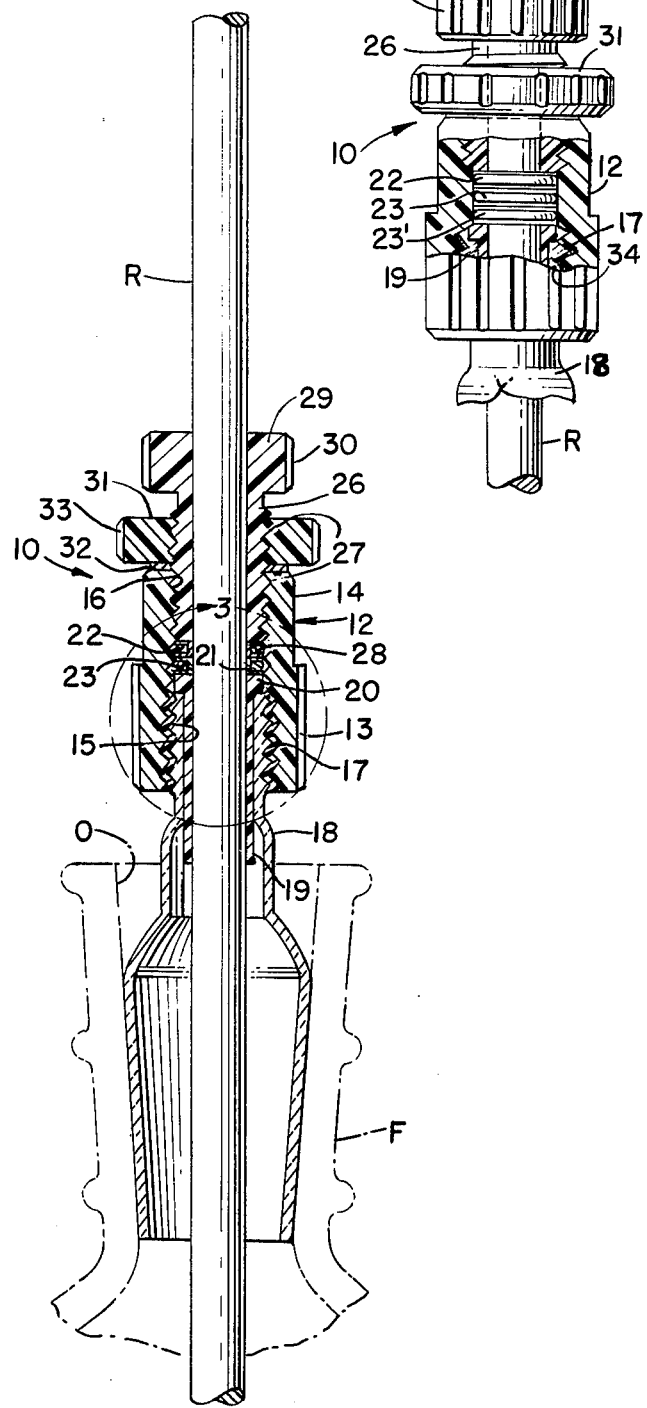
FIG.2.
FIG.4.

SEALING MEANS FOR STIRRING APPARATUS

BACKGROUND OF THE INVENTION

This invention relates to improvements in equipment for chemical, food and other material treatment in laboratories and the like, and is directed particularly to improvements in leakage preventing seals and especially seals or sealing means associated with stirring equipment.

In many operations performed in laboratories the stirring of materials in sealed flasks is carried out. In these stirring operations a stirring rod of glass or the like may pass through the neck of the flask and carry a stirring blade means on its lower end within the flask, while the outer or upper end of the rod is connected with a suitable source of power for rotating the rod. Since the flasks under certain conditions must be kept tightly sealed or closed while such a stirring operation is being carried out, a seal must be maintained at all times between the rotating stirring rod and a seal or closure member in the mouth or neck of the flask to prevent liquids or vapors creeping along the stirring rod or shaft and escaping from the flask, where the flask may be kept under pressure from within during the stirring operation, and it is also important that such a seal be maintained to prevent the passage of dust or other material along the stirring rod and into the flask, on those occasions where a reduced pressure may be maintained in the flask.

There are many types of seals in use in the prior art for effecting liquid tight seals between stirring apparatus and a flask, and one type of such prior art seal as used in vacuum desiccating equipment utilizes a sealing fluid, such as mercury, for example. This is objectionable in the carrying out of certain operations, such as in the performance of distillation operations connected with the production of food or the like, or in other instances wherein the use of mercury would constitute a hazard. Also, the use of such seals creates excessive torsional forces which places strain upon rotating elements of the stirring apparatus. Other prior art devices utilize mechanical seals wherein various plastic elements in combination with metallic elements are used, and in fact, in those instances wherein a high number of revolutions per minute is required over a long period of time, metal components may be used. However, these seals are not satisfactory, since galling of metal or glass materials frequently occurs and the seal is thus destroyed or excessive pressures are required in order to effect a seal between the diverse materials, with the result that additional power is required in order to operate the stirring apparatus. Moreover, these prior art seals do not have means for enabling manual adjustment of the sealing pressure exerted on the rod of the stirring apparatus.

OBJECTS OF THE INVENTION

Accordingly, it is an object of this invention to provide a sealing means for a stirring apparatus, wherein all contact between relatively movable parts is between low friction synthetic plastic material and glass.

Another object of the invention is to provide a seal for stirring apparatus, wherein seal clamp and adjusting means is provided to enable the seal to be adjusted to compensate for wear and the like.

A further object of this invention is to provide a seal for effecting a leakproof seal between an elongate glass rod of a stirrer apparatus and the opening or neck of a flask and the like, and wherein the elements of the seal which are engaged with the glass rod comprise a low friction synthetic plastic material, said seal further being simple and economical in construction and reliable in use and having means to enable the seal to be adjusted to compensate for wear of the seal and the like.

BRIEF DESCRIPTION OF THE DRAWINGS

FIG. 1 is a view in elevation with parts in section of a stirrer apparatus and flask with the seal means according to the invention operatively associated therewith.

FIG. 2 is an enlarged fragmentary view in section of a portion of the stirrer apparatus and the seal means of the invention.

FIG. 3 is a greatly enlarged, fragmentary, sectional view of the area indicated by the circle 3 in FIG. 2.

FIG. 4 is a fragmentary view with parts thereof in section of a modified seal means according to the invention.

DETAILED DESCRIPTION OF THE INVENTION

In the drawings, wherein like reference numerals indicate like parts throughout the several views, a sealing means in accordance with the present invention is indicated generally at 10 in operative association with a stirring apparatus 11 comprising glass rod R and stirrer blade means B fixed on the lower end of the rod and disposed within the contents C of a glass laboratory flask F and the like, and having a suitable adaptor means A on the other or upper end thereof, whereby the glass rod R may be suitably connected with a power means P, such as an electric motor or the like, to be driven thereby.

The flask F, stirrer means 11, power means P and the like may all operatively be supported on suitable support means, such as disclosed in U.S. Pat. No. 3,251,635, for example, for use of the sealing means with such laboratory equipment, although the sealing means could be used with other apparatus, if desired.

The sealing means 10 comprises an elongate, tubular, synthetic plastic sleeve 12 having axially extending grip enhancing flutes 13 on one end thereof, and a substantially smooth, cylindrical outer surface 14 at the other end thereof. The sleeve is internally threaded at opposite ends at 15 and 16, respectively. The threads at one end 15 are complemental to the external threads 17 on the neck of a stopper 18, made of a material such as glass and the like, and adapted to be sealingly disposed in the opening O of the neck of the flask F. An elongate, tubular bearing sleeve 19 of synthetic plastic material is fitted between the outer surface of glass rod R and the inner surface of stopper 18, and the upper end of bearing sleeve 19 has a radially outwardly extending flange 20 thereon presenting an upwardly facing tapered or angled surface 21 for cooperation with a sealing ring means shown in the specific example illustrated as comprising two sealing rings 22 and 23, each comprising a substantially channel-shaped annular bearing ring support 24 and an annular O-ring 25 disposed in the supports 24. An elongate seal ring clamping and adjusting means 26 is externally threaded at 27 and extends at a substantially flat, planar, annular lower end 28 into engagement with the seal rings 22 and 23 to urge the seal rings downwardly against the tapered surface 21 of bearing sleeve 19, whereby the sealing rings are urged inwardly into tighter sealing engagement with the outer surface of the rod R. The upper end of the seal clamping means 26 is enlarged at 29 and has a plurality of axially extending flutes 30 thereon to enhance gripping thereof and thus facilitate adjustment of the seal clamping means relative to the sleeve 12. A synthetic plastic lock nut 31 is threadably engaged on the externally threaded portion 27 of seal clamping means 26 for engagement with the end of sleeve 12 to lock the seal clamping and adjusting means in adjusted position, and a resilient annular sealing washer 32 is disposed between the end of sleeve 12 and the lock nut 31. The outer periphery of the lock nut is also fluted at 33 to facilitate gripping thereof.

As seen best in FIG. 3, a strip of Teflon tape 34 or a suitable Teflon coating is placed on the threads 17 of stopper 18 to enhance the seal between the sleeve 12 and the neck of the stopper 18. In use, the sleeve 12 is tightly threadably engaged on the stopper 18 and is not loosened for subsequent uses of the seal means. In the event that it becomes necessary to loosen the sleeve from the stopper, then a fresh strip of Teflon tape and the like should be applied to the threads of the stopper before reapplying the sleeve thereto.

Further, in use of the seal means of the invention, the various components of the seal means, including the stopper 18, are assembled on the glass rod R and the rod R, along with blade means B attached thereto, are inserted into a flask F and the stopper 18 is tightly positioned in the opening O of the neck of the flask F. The sleeve 12 is then tightly threadably engaged on the stopper, and the seal adjusting and clamping means 26 is then threaded into engagement with the seal rings 22 and 23 until the desired tightness of the seal or the desired sealing pressure is exerted between the seal rings and the glass rod R, and the lock nut 31 is then adjusted against the end of sleeve 12 to lock the parts in assembled relationship. In this connection, the parts should not be adjusted so tightly as to prevent rotation of the glass rod R in the seal means.

In FIG. 4 a modification of the invention is illustrated, and in this form of the invention all of the components of the seal means are exactly as described previously, except rather than two seal rings 22 and 23, three seal rings 22, 23 and 23' are shown. Of course, any number of seal rings from one to many could be used as desired, depending upon the type of seal desired to be effected.

The synthetic plastic material of which the sleeve 12, bearing sleeve 19, seal adjusting and clamping means 26 and lock nut 31 are made is Teflon. Also, the channel shaped seal ring supports 24 comprise Teflon.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. In combination, a stirring apparatus including an elongate rod having stirrer blade means on one end thereof for disposition in a flask and the like to stir the contents of the flask and power means connected with the other end of the rod to rotate the rod and stirrer blade means, and a seal for effecting a liquid-tight seal between the stirring apparatus and an opening in a laboratory flask and the like, said seal including a generally tubular stopper for fitting in the opening of the flask, said stopper having a bore therethrough and external threads on one end thereof; a sleeve means having internal threads on both ends thereof and threadably engaged at one end thereof with the threads of the stopper and means for forming a positive seal between the threaded members; a bearing sleeve positioned within the bore defined in said stopper one end and having a shoulder thereon resting on the upper surface of said stopper one end; seal ring means positioned within the sleeve means in abutting engagement with the upper surface of said bearing sleeve shoulder; and a generally tubular seal clamping and adjusting means threadably engaged with the other end of the sleeve means and extended into engagement with the seal ring means to urge the seal ring means into secure sealing engagement with said rod extended coaxially through the stopper, sleeve means, seal ring means and seal clamping and adjusting means.

2. A seal as in claim 1, wherein the stopper comprises glass; and the sleeve means, seal ring means and seal clamping and adjusting means all comprise synthetic plastic.

3. A seal as in claim 2, wherein said bearing sleeve and sleeve means are synthetic plastic.

4. A seal as in claim 3, wherein a lock nut is threadably engaged on the seal clamping and adjusting means for engagement with the other end of the sleeve means to lock the seal clamping and adjusting means in adjusted position.

5. A seal as in claim 4, wherein a resilient sealing washer is engaged between the lock nut and sleeve means.

6. A seal as in claim 3, wherein the shoulder is tapered inwardly such that the seal ring means are urged radially inwardly when clamping pressure is exerted thereon.

7. A seal as in claim 1, wherein the shoulder is tapered inwardly such that the seal ring means are urged radially inwardly when clamping pressure is exerted thereon.

8. A seal as in claim 7, wherein the stopper comprises glas and said positive seal forming means includes a strip of synthetic plastic tape disposed on the threads thereof and conforming in shape thereto, said sleeve means threadably engaged over said tape.

9. A seal as in claim 1, wherein the seal ring means comprises a single, annular, channel shaped, synthetic plastic holder having a cylindrical inner wall engaged with the rod and a pair of axially spaced apart annular side walls on opposite ends of the inner wall; and an annular, resilient seal ring disposed in the holder.

10. A seal as in claim 1, wherein the seal ring means comprises a plurality of annular, channel shaped, synthetic plastic holders, each having a cylindrical inner wall engaged with the rod and a pair of axially spaced apart annular side walls on opposite ends of the inner wall; and an annular, resilient seal ring disposed in each holder.

* * * * *